United States Patent [19]
Laurence

[11] Patent Number: 5,898,790
[45] Date of Patent: Apr. 27, 1999

[54] DIGITAL IMAGING AND ANALYSIS SYSTEM

[75] Inventor: Peter C. Laurence, Danville, Calif.

[73] Assignee: Maxwell Technologies, Inc., San Diego, Calif.

[21] Appl. No.: 08/744,125

[22] Filed: Nov. 5, 1996

[51] Int. Cl.[6] .............................. G06K 9/40; G06K 9/62
[52] U.S. Cl. ..................... 382/100; 382/203; 382/275; 378/62; 378/98
[58] Field of Search .................... 382/100, 132, 382/274, 275, 323, 203; 378/62, 207, 91, 98, 98.2; 358/487

[56] References Cited

U.S. PATENT DOCUMENTS

| | | | |
|---|---|---|---|
| 3,984,629 | 10/1976 | Gorog | 358/479 |
| 4,374,495 | 2/1983 | Thomanek | 102/476 |
| 4,453,268 | 6/1984 | Britt | 382/323 |
| 4,520,702 | 6/1985 | Davis et al. | 83/76.8 |
| 4,827,143 | 5/1989 | Munakata et al. | 250/574 |
| 4,893,922 | 1/1990 | Eichweber | 356/3.12 |
| 4,922,337 | 5/1990 | Hunt et al. | 348/88 |
| 5,241,406 | 8/1993 | Johnston et al. | 358/487 |
| 5,301,240 | 4/1994 | Stockum et al. | 382/100 |
| 5,384,862 | 1/1995 | Echerer et al. | 382/132 |
| 5,410,144 | 4/1995 | Lavelle et al. | 358/487 |

OTHER PUBLICATIONS

Fuchs et al. "Measuring Detonation Front Configuration via Flash Radiography and Ultra High Speed Photography." Proceedings of SPIE, vol. 832, pp. 130–137, 1988.

Primary Examiner—Jon Chang
Attorney, Agent, or Firm—Wiggin & Dana; Gregory S. Rosenblatt; Thomas F. Presson

[57] ABSTRACT

A system for digitally scanning and analyzing x-ray images includes a digital camera and a light box optically coupled to substantially eliminate noise in the digitized image. The digital image is analyzed and compared to baseline digital images to determine characteristics between the two images.

4 Claims, 2 Drawing Sheets

DIGITAL IMAGING AND ANALYSIS SYSTEM

BACKGROUND OF THE INVENTION

1. Field of the Invention

This invention relates to the analysis of images created via an x-ray source. More particularly, the invention relates to digitizing an x-ray film and analyzing its image.

2. Discussion of the Related Art

Different solids absorb x-rays, a type of electromagnetic radiation, at different rates. A photographic plate behind an object may record the amount of x-rays passing through the object or scattered by it to create a shadow image. The photographic plate is developed and an x-ray image results on a film having varying gray levels of transparency. Typically, these film are 14 inches by 17 inches.

X-ray films made by the above process serve as invaluable tools for those involved in the scientific, medical, and industrial endeavors. Those people reading the x-ray films typically view and analyze the images using a light box or light table for passing light through the x-ray films.

Some of the endeavors require quantitatively analyzing the x-ray film, for example, measuring tumor size in medical applications and ballistic performance in projectile and explosive development application. This type of analyzing requires measuring the size of each feature and comparing that size with predicted results or charting changes in size over a period of time. Currently such measuring is accomplished by hand. For applications in the development of shaped charges, for example, the film measuring and reduction for a single test firing exceeds one manday.

Recent advances in computer technology allow scanning of x-ray films to create digitized files. Various software tools allow applications of a wide range of image enhancements and analytical tools to the digitized x-ray film. For example, software may "pseudo-color" to the gray scale levels in the digitized x-ray image to aid in visual review of the x-ray image.

Another advantage of digitizing is electronic storage and retrieval of x-rays images. Having x-ray images stored on computer accessible media significantly reduces and replaces the physical space required to store x-ray films. Furthermore, the time necessary to retrieve an x-ray image from computer accessible media is negligible compared to physical retrieval of an x-ray film. Additionally, due to today's ease of computer interconnectivity, the actual physical location of the digitized files may be different from the location where the x-ray image is viewed or analyzed.

Several systems and methods for digitizing x-ray films are known. Typically, these systems capture a video image and then make a conversion from analog to digital. The video image is created by a plurality of charge-coupled devices (CCDs) in either a one dimensional or two dimensional array.

The one dimensional array includes a plurality of CCDs aligned along a single line. In such an arrangement, the linear array or the film must travel relative to each other. This traveling is one source of noise or error in digitizing the film.

The two dimensional array typically assumes a fixed square field of view and so has an N×N array of CCDs, where N is the number of CCDs in one direction. Square arrays of CCDs are not conducive to scanning a fourteen by seventeen inch x-ray film.

Since the scanning rate and area for both arrays are fixed, neither array allows users to scan a selected portion of a film in a resolution higher than that for the whole scan area.

These typical scanning systems scan the x-ray films in gray scale via the transmissive characteristics of the films and are thus not suited to multiple applications such as those additionally including multi-color reflective transmission from an object.

There is a need for an x-ray film digitizing system that reliably digitizes x-ray film that is simple and cost effective to build and use.

There is also a need for a x-ray film scanning system that reliably digitizes x-ray films with significant reductions in noise and creates a digitized image allowing processing heretofore not contemplated. There is also need new techniques and methods for analyzing digitized x-ray films to provide significant advantages in older, more time consuming method and techniques.

SUMMARY OF THE INVENTION

Accordingly, the present invention is directed to a digital imaging and analysis system that substantially obviates one or more of the problems due to limitations and disadvantages of the related art.

In accordance with the purpose of the invention, as embodied and broadly described, the system of the present invention includes a linear array digital scanning camera for generating a digital image from an x-ray placed on a light source having a frequency coupled to a scanning rate of the camera at a distance from a field of view of the camera. The digitized image is received and analyzed by an image analyzer connected to the camera.

In another perspective the system includes a linear array digital scanning camera for generating a digital image and a light source having a frequency effective to substantially eliminate noise from the digital image and an image analyzer connected to the camera for receiving and processing a digital image.

A method according to the present invention includes the steps of providing a linear digital scanning camera and a scan rate and then determining a light frequency for a light box effective to match and scan rate and effectively eliminate noise.

In another method according to the present invention, the step include taking x-rays of baseline shapes along a predicted shot path of the shaped charge and then comparing scanned versions of the baseline x-ray and an x-ray image of an explosive event.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, and illustrate embodiments of the invention and together with the description, serve to explain the principles of the invention.

BRIEF DESCRIPTION OF THE PREFERRED EMBODIMENTS

In the Figures:

FIG. 1 illustrates one preferred embodiment of a digital imaging and analysis system according to the invention; and FIG. 2 illustrates a shot chamber utilizing the system of FIG. 1.

DETAILED DESCRIPTION OF THE PREFERRED EMBODIMENTS

Figure 1:
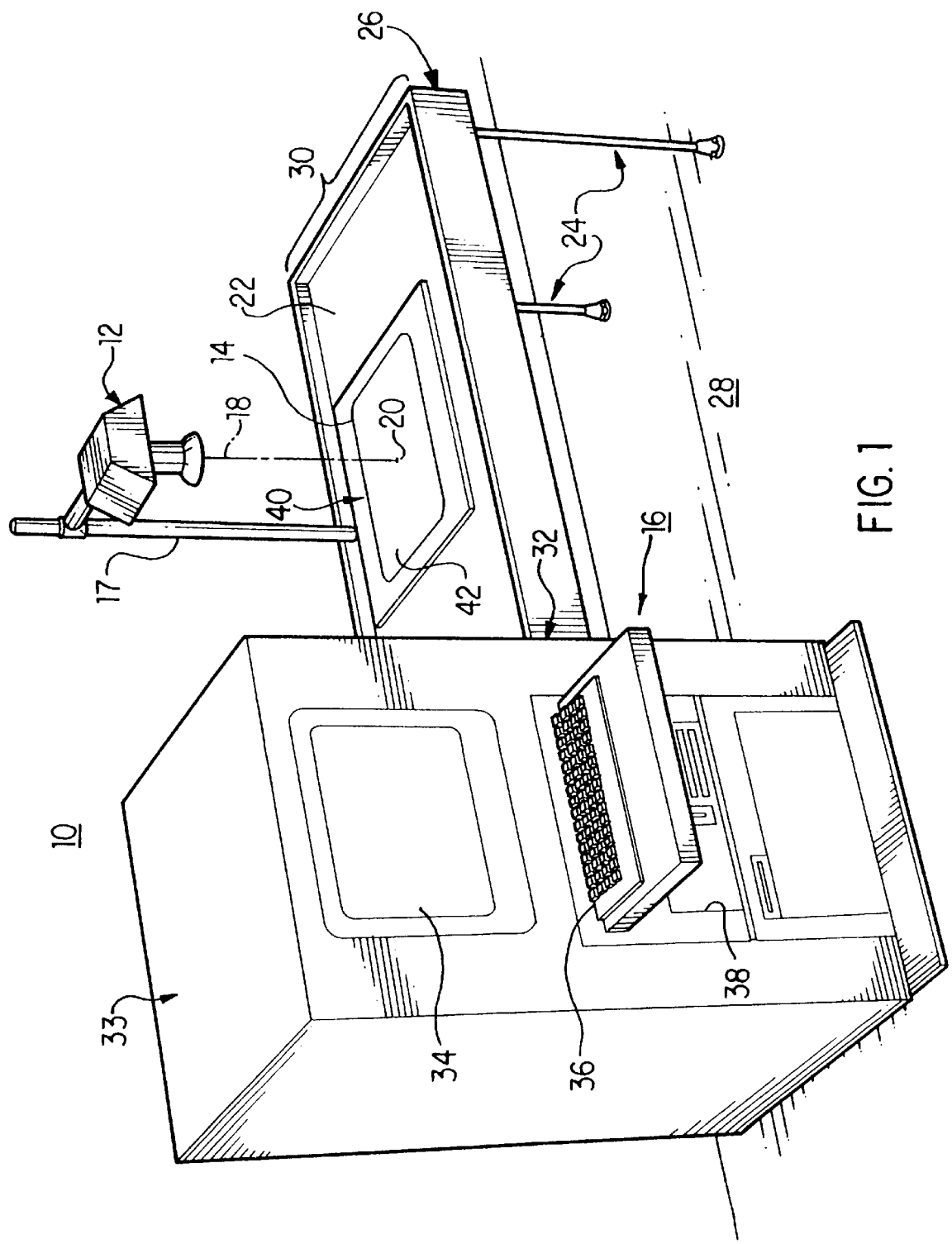

An x-ray film digitizing and analysis system for full scale x-ray films was desired to fill the voids left by and solve the problems inherent in the prior art. Additionally, it was desired that the system also to have the ability to input images created from reflective light thereby allowing comparisons between the inside of an object, via x-ray, and the outside of the object, via reflected light.

Initially, attempts were made to create this system using commercially available video analog image capturing devices, but these devices were inherently too noisy for accurate image analysis. Digital image capturing devices were utilized in the hope of decreasing the amount of noise inherent in the analog to digital conversion within video capturing devices. Surprisingly, the digitized images from these devices also contained a significant amount of noise. Furthermore, these devices either required moving the sensor or the film to complete a scanning pass of the x-ray film which further increased noise.

A camera was chosen to have a three color scanning array of CCDs so that neither camera nor film would have to be moved during the scanning. This digital camera, surprisingly also showed a significant amount of noise in the digitized image.

In an attempt to minimize the noise, a variety of light box sources were tried, but none yielded satisfactory images. After lengthy experimentation it was determined that the digital camera was not able to resolve the fluorescent transmitted light passing through the x-ray film from the light box. It was then determined that this type of digital camera had never been utilized with diffused fluorescent light boxes typically used in viewing x-ray films.

The digital camera was determined to be optimized for light received from a black body radiator whose light frequency is constant and has a color temperature on the order of 3400 to 5500 Kelvin. Such light sources, however, generate excessive amounts of heat when operating because the heat generated by black body radiators is high. For example, an incandescent light source has a physical temperatures from about 500 Kelvin up to of 750 Kelvin. The use of such light sources would make the system impractical because of the requirement to dissipate such great amounts of heat while obtaining a clear image and without melting the x-ray film. Accordingly, it was determined that a low physical temperature light source was needed that would operate with the digital camera, but that light source would not be a black body radiator because its light would be pulsed. Furthermore, the light source needed to be a diffused light source and not a point light source so that the x-ray film was uniformly illuminated from behind. Accordingly, a florescent source was chosen.

The camera specifications set out that the camera would operate for florescent light sources having frequencies from 1 kHz to 5 kHz and that the camera would match such light sources on a scan frequency from 4.5 ms to 9.0 ms. As mentioned above, these numbers were determined using a light source with a color temperature approximating that of a black body radiator. Conventional low frequency light sources such as typical fluorescent sources found in light boxes operate from about 1 kHz to about 5 kHz and may operate at color temperatures lower than those of black body radiators. Such frequencies and color temperatures are taught away from by the camera specifications and typical applications for viewing and digitizing x-ray films.

Various standard low frequency light boxes were tried having light frequencies from about 1 kHz to about 5 kHz, but in each case the camera failed to resolve onto the light source and a poor scan resulted. Eventually, and surprisingly, a frequency range and light source color range was found wherein the camera was able to lock onto the fluorescent transmitted light and produce digitized images of x-ray film substantially noise-free. The system includes slightly modified commercially available components put together in a new and nonobvious way to produce results long needed and heretofore unavailable.

A substantially noise-free digital image of an x-ray allows analysis and techniques previously thought inapplicable due to technical limitations to be applied to digitized x-rays for the first time using computerized tools and at cost savings far beyond that of simply automating previous techniques.

A digital imaging and analysis system according to the invention includes a digital camera, a light box, and an image analyzer. Reference will now be made in detail to the present preferred embodiments of the invention, examples of which are illustrated in the accompanying drawings.

One exemplary embodiment of the system is illustrated in FIG. 1 and denoted generally by reference numeral 10. As embodied herein and referring to FIG. 1, system 10 includes a digital camera 12, a light box 14, and an image analyzer 16.

The digital camera 12 is slidably mounted on a pole 17 above the light box 14 so that the camera 12 may be moved vertically along a line 18 perpendicular to the light box 14 and running through the center 20 of the light box 14. The pole 17 is affixed to a support table 22. The support table 22 also provides support for the light box 14. Legs 24 support a first side 26 of support table 22. The legs 24 each are perpendicular to the support table 22 and the floor 28 and located on corners 30 on opposing ends of the first side 26. A housing cabinet 33 provide supports for a second side 32 of support table 22. The support table 22 includes means for attachment (not shown) for removably attaching the support table 22 to the housing cabinet 33. The legs 24 and the means for attachment are adjustable in that the height of the support table 22 above the floor 28 may be varied.

The digital camera 12 connects electronically to the image analyzer 16 located in housing cabinet 33. The image analyzer may preferably include a monitor 34, a keyboard 36, and a processing cabinet 38, and may also include other input devices such as a light pen or mouse (not shown). The image analyzer may also include connections to phone lines, local area networks, the Internet, or any other connection to desired peripherals or communication or network media (not shown).

The light box 14 is generally comparable to conventional light box sources used by those who view or analyze x-ray films. For example, the light box 14 includes a fluorescent light source located within the light box housing to provide a generally diffuse light source for transmission through an x-ray film. The light source does not have a frequency range from 1 kHz to 5 kHz as does conventional light boxes. It was determined that optimal results were obtained for the particular digital camera when the light box was powered at 115 volts at 60 cycles per second and a frequency rate from about 19 kHz to about 25 kHz. More preferably, a frequency range from about 20 kHz to about of 24 kHz, and most preferred, from about 21 kHz to about 23 kHz.

It was determined that the described frequency ranges of the camera were too low for low physical temperature light sources. To apply the aspects of the invention to other digital linear scanning array cameras requires determining a matching frequency rate of the light source with the scan rate of the CCD. To do so, surprisingly results in a substantially noise free, optically coupled, full color frequency matched light source.

The light box 14 provides a flat surface 40 upon which a user places an x-ray film 42. The diffuse light passes through the x-ray film 42 in varying intensities depending on the characteristics of the x-ray film image.

The light passing through the x-ray film 42 is captured by a focusing lens located on the digital camera 12 in a plane parallel to the flat surface 40. The lens focuses the light onto a variable linear scanning array of 3400 lines of 2700 elements, and each element having a separate CCD for red, green, and blue (RGB). Each CCD element produces 12 bits of dynamic range for a total of 36 bits for each of the 2700 elements in each of the 3400 lines. The tri-linear RGB CCD chip is embodied in a case allowing the chip to be optically coupled for analog light collection in the form of photonic energy. The chip uses three CCD elements one for each band corresponding to red, green, and blue and converts the signals to a digital form. By having a separate detector for each color band and performing the analog to digital conversion at the chip level reduces signal to noise ratios, eliminates color crossovers, and improves the overall dynamic range of the camera. Furthermore, a separate signal processor is not needed to perform the analog to digital conversion, thus complexity and noise are reduced. The digital signals output from the camera may be used by the image analyzer without further signal processing. One such digital camera may be preferably the Lumina camera form Leaf Systems, Inc. of Southborough, Mass.

Operating the above system to take advantages of the features synergistically found in the combination requires proper through gray-scale, density, and shape calibration. The calibration proceeds according to the following steps.

The first step is to identify a fast screen and film set suitable for a high speed explosive tests. For example, Kodak MR-1 with Lanes fast front, and back of film. The film should always be processed at the same temperature for the same amount of time using the same developer/fixer to insure consistent film density results. For example, one preferred temperature is 68 degrees F. using Kodak GBX developer/Fixer at 6 minutes. This is extremely important to insure accurate density measurements.

Figure 2:
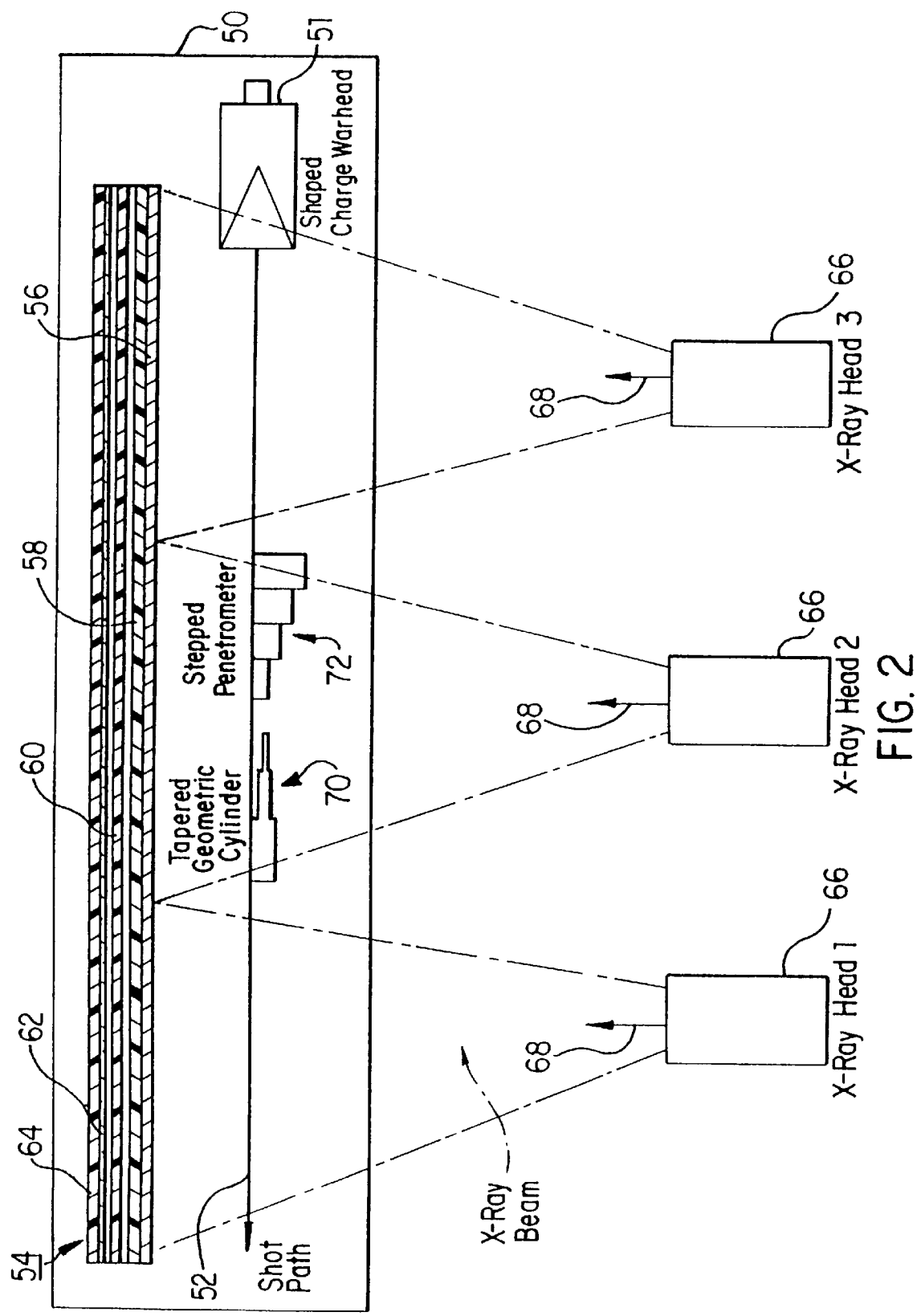

Next, geometric shapes are placed in the shot plane to insure consistent x-ray exposure and magnification. FIG. 2 illustrates one preferred example.

FIG. 2 includes a shot chamber 50. Within the shot chamber is a shaped charge warhead 51 that, when fired, directs a charge along a shot path 52. Also within the shot chamber 50 is an assembly 54 located in the same plane but offset from the shot path 52 and includes a sandwich having in series an aluminum plate 56, a ballistic foam 58, an x-ray film 60, a florescent screen 62, and black plastic 64. The side of the sandwich having the aluminum plate 56 at the outside faces the shot path 52.

Opposite the assembly are x-ray heads 66 for generating x-rays 68. Between the x-ray heads 66 and the assembly 54 are geometric shapes 70 and 72. Geometric shape 70 provides for calibration of edge detection and geometric shape 72 provides for a calibration of linear density.

A model is established by exposing a film 60 with geometric shapes 70 and 72, and then processing the film according to the above. This will establish baseline densities and edge detection for calibration. This film model is used for calibration.

The geometric shapes 70 and 72 are left in the shot chamber 50 during the explosive event. The densities in the x-ray from the explosive event may be different from the base line film due to scatter from debris, fire and smoke.

After the x-ray films are retrieved from the explosive event and processed, the x-ray firm is scanned and processed according to the following.

A 14 inch by 17 inch x-ray film can be read into a database for precise assembly and analysis. The film model is compared for actual shot film, and a density gradient can be determined. This information is placed in the analysis program for precise edge detection, correct size, and sheet calibration where thresholds are set as a function of image intensity. Accurate sheet and density measurements are mandatory to determine edge detail from the scanned image. This is the basis of object analysis. The separate image files are assembled with a basic splice function using faducials pre-exposed onto the film. Points are determined on the edge of each x-ray and the analysis computer program splices the image together automatically. Once the desired number of images are spliced, you are now ready to calibrate image density fill functions, mass and distance measurements for velocity. By using a distance calibration menu you can choose one, two or three point distant measurements to calibrate scale. One can calibrate in any unit of measurement that fits a desired analysis routine. Velocity can be determined by selecting the same particle two separate exposures at separate times and since distance has been calibrated using point measurement calibration, velocity can be calibrated, calculated in a simple macro function. Mass will be determined by comparing the film model and the actual data comparing the geometric shapes 70 and 72 and assuming x-ray penetration through a known material and thickness, i.e., copper. This is compared to the image particle of the actual shot data. Using the fill function, you can determine a wide variety of measurements, such as area, mass, perimeter, edge detail, shape factor, including intensity measurements. These functions are calibrated using the original film model of each geometric shapes 70 and 72. Through this film model and the actual shot film, comparison can be made regarding image density. From here manual or automatic thresholds can be set providing the film is of consistent process. Once accurate thresholds have been set, you now can perform image reconstruction or image equalization using various binary filters that are contained within the base analysis program. The x-ray image file can be normalized and enhanced using a histogram reconstruction function or histogram stretch. After image splicing, calibration, enhancement and reconstruction, all qualitative and quantitative information can be stored on an spreadsheet, such as Excell ("EXCELL" is a registered trademark of Microsoft Corp. of Redmond, Wash.), for further image modeling within alternate analysis programs. Separate routines can be written as macros to perform additional analysis function that enhance the overall capabilities of the base analysis software.

Finally, the image file can be outputted directly into a word document, such a Microsoft Word ("MICROSOFT WORD" is a registered trademark of Microsoft Corp. of Redmond, Wash.), as an image TIFF file, or the file can be outputted directly photoquality dye sublimation printer for presentation purposes. The system can also be used as a server and the analysis program can be networked through multiple workstations.

Those skilled in the art will immediately realize various modifications and variations that can be made in the digital imaging and analysis system of the present invention without departing from the spirit of scope of the invention. Thus, it is intended that the present invention cover the modifications and variations of this invention provided they come within the scope of the appended claims and their equivalents.

What is claimed is:

1. A method of analyzing an explosive event from a shaped charge comprising the steps of:

placing geometric shapes having known edges and densities along a predicted shot path of the shaped charge;

taking an x-ray image of the geometric shapes to create a baseline;

activating the shaped charge to create the explosive event;

taking an x-ray image of the explosive event;

digitally scanning both of the x-ray images and inputting both x-ray images into an image analyzer; and using the baseline to determine characteristics of the explosive event.

2. The method of claim 1 wherein the digitally scanning step is performed at a scanning rate from about 4.5 ms to about 9.0 ms.

3. The method as described in claim 1 further comprising: providing a continuous x-ray source.

4. The method as described in claim 1 further comprising utilizing a specific film and a specific screen to produce said x-ray images.

* * * * *